Feb. 11, 1969    D. L. JOHNSTON    3,427,098
SUNSHADE ATTACHMENT FOR EYEGLASSES
Filed June 13, 1966
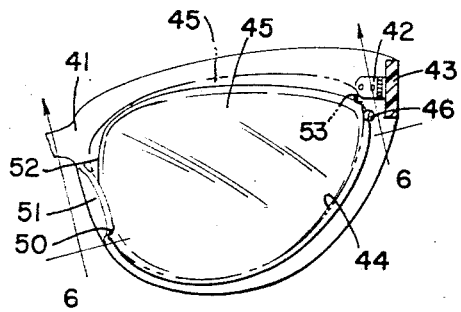
FIG-5-
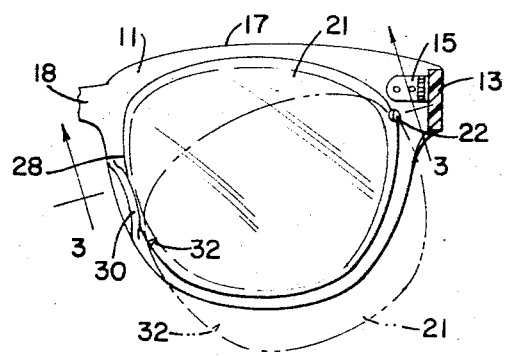
FIG-2-
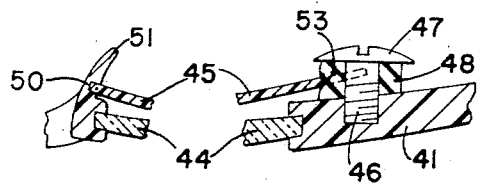
FIG-6-
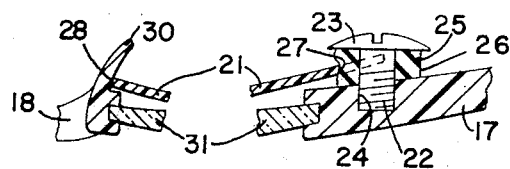
FIG-3-
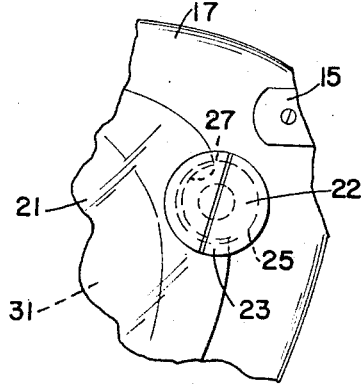
FIG-4-
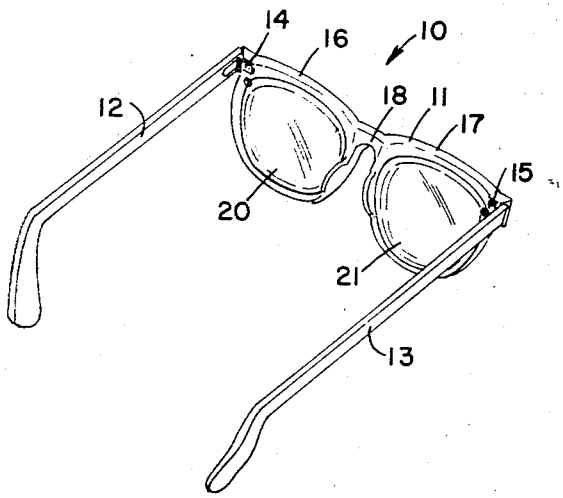
FIG-1-
INVENTOR.
DONALD L. JOHNSTON
BY Greist, Lockwood,
Greenawalt & Dewey ATT'YS.

3,427,098

Patented Feb. 11, 1969

3,427,098

SUNSHADE ATTACHMENT FOR EYEGLASSES

Donald L. Johnston, Hammond, Ind., assignor of one-half to Leland Strouse, Flossmoor, Ill.

Filed June 13, 1966, Ser. No. 557,266
U.S. Cl. 351—47 4 Claims
Int. Cl. G02c 9/00, 7/08, 1/00

This invention relates to sunshade attachments for eyeglasses and in particular is directed to a new and improved technique of mounting sunshade type lenses for easy attachment and removal from the frame of a pair of existing eyeglasses. In addition to the foregoing features, the sunshade attachments of the present invention are easily stored and when installed on the eyeglass frame, present a pleasant outward cosmetic appearance not unlike that of prescription-type sunglasses.

The prior art is replete with sunshades of various types adapted for attachment to eyeglasses through the provision of clamping lugs, clips and the like. Several disadvantages are inherent in such arrangements of this general type. In particular, the distraction caused the wearer by the particular type of means holding the sunshade to the frame is undesirable. Also, the presence of such clips or clamping means detracts from the overall cosmetic appearance of the eyeglasses. In order to avoid these disadvantages, persons who wear corrective lenses have resorted to purchasing a second pair of eyeglasses having tinted lenses ground to their particular prescription. Such prescription-type sunglasses avoid the undesirable features of the clip-on or clamp-on type sunshades, however, they have certain disadvantages in that they are expensive initially, cumbersome to transport, and more susceptible to breakage than the plastic type of snap-on sunshades. Also, when the corrective lenses need to be replaced, as is the usual case every few years, the expense of replacement is doubled.

The present invention relates to a unique manner of mounting sunshade lenses on existing eyeglasses in such a manner so as to facilitate easy attachment and removal. Each lens is independently removable from the eyeglasses, and due to the unique mounting arrangement, each lens is located behind the corrective lens to provide a cosmetic appearance like that of the prescription-type sunglasses. Since the particular lenses contain no clamping means, clips or the like, the eye distraction experienced with the clip-on sunglasses is obviated. With each of the lenses being independent of the other, they may be compactly stored by stacking one over the other with a suitable intermediate shield to prevent scratching. Inasmuch as the lenses may be formed from a plastic they are less susceptible to breakage, and quite inexpensive when compared to the price of prescription-type lenses or even clip-on sunshades.

Additional advantages of the novel sunshade mounting arrangement will become apparent on a consideration of the objects and detailed description of a preferred form.

It is a principal object of this invention to provide a sunshade attachment for eyeglasses which is easily attached and removed and which is free of clips, clamps and the like.

It is a further object of this invention to provide a new and improved sunshade mounting arrangement which due to its unique mounting does not detract from the cosmetic appearance of the eyeglasses or distract the wearer.

It is a further object of this invention to provide a new and improved mounting arrangement and sunshade construction which permits the sunshade lenses to be individually attached and removed and thereby providing for easy and compact storage during periods of non-use.

It is a still further object of this invention to provide a novel mounting arrangement for sunshade lenses which is adaptable to a wide variety of eyeglass frames.

Additional objects and advantages of the present invention will become apparent on consideration of the following description and the accompanying drawings.

In the drawings:

FIG. 1 is a perspective view of a pair of eyeglasses looking down on the rearward side of the frame with the temples in the extended position;

FIG. 2 is an enlarged rear elevational view of the glasses shown in FIG. 1 with the sunshade attachment of the present invention shown in outline in phantom lines in the position assumed during the process of attachment and in solid lines after attachment to the frame;

FIG. 3 is an enlarged cross sectional broken fragmentary view taken generally along the line 3—3 of FIG. 2;

FIG. 4 is an enlarged fragmentary detailed plan view of the post mounting arrangement illustrating its cooperation with the sunshade lens;

FIG. 5 is a fragmentary view of a modified form of frame; and

FIG. 6 is a fragmentary cross sectional view taken generally along the lines 6—6 of FIG. 5.

Referring now to FIG. 1, a pair of eyeglasses 10 includes a conventional frame 11, and temple pieces 12 and 13. Each of the temples pieces is attached to the frame 11 by means of temple attachment or hinge portions 14 and 15, respectively, these also being of conventional design. The frame 11 includes a pair of lens mounting rims 16 and 17 joined by a bridging portion 18 which maintains corrective lenses mounted in each of the rims in spaced relation to each other for proper disposition in front of the wearer's eyes. A pair of sunshade lenses 20 and 21 are received on the rearward side of the frame 11 in overlying relation to the corrective lenses and are carried in the associated rims 16 and 17 respectivley, and are mounted by a novel mounting means.

Referring now to FIGS. 2–4, the unique manner of mounting the sunshade lenses 20 and 21 on the inside of the frame 11 of the eyeglasses 10 will be described. A post means 22 is provided with an enlarged head 23, and may be formed by a self-tapping threaded fastener or the like inserted in an aperture 24 formed in the frame 17. The post means 22 may be located closely adjacent the temple attachment means 15 at the outer margin of the rim 17 or if desired, may be formed integral with the temple attachment means 15 at manufacture to reduce the cost and insure proper location.

Intermediate of the enlarged head 23 and the rim 17 on the post means 22 is provided an elastomeric bushing 25 formed from any suitable resilient material such as rubber or the like. The circumferential portion 26 of the bushing 25 is slightly less in diameter than the enlarged head 23 for reasons to become apparent.

The sunshade lens 21 is provided with a notched portion 27 which is received around a portion of the post 25 to cause a slight deformation in the circumferential portion 26. The opposite or inside peripheral portion 28 of the sunshade lens 21 engages an abutment means 30 which may be formed integral with the frame 11. In the illustrated embodiment, the abutment means 30 consists of the outer side of the nose piece which is formed integral with the rim 17. A similar nose piece forms a like abutment means on the rim 16 for the sunshade lens 20. Obviously, a slight notch may be also formed in the nose piece at manufacture to accommodate the lens if desired.

As the mounting arrangement and shape of the sunshade lens 20 is a mirror image of the lens 21, description of the details will be limited to the sunshade lens 21. When the sunshade lens 21 is in the installed position, one peripheral margin engages the abutment means 30 while the notch 27 at the opposite margin is resiliently engaged by the elastomeric bushing 25. This serves to hold the lens 21 in spaced relation to the corrective lens shown in fragmentary cross section at 31 in FIG. 2, thereby preventing the development of Newtonian rings.

The dimension of the lens taken in a straight line from the bottom of the notch 27 to the periphery which engages the abutment 30 is slightly greater than the dimension from the outer circumferential portion 26 of the elastomeric bushing 25 to the abutment 30 to cause a slight flexing of the resilient sunshade 21 as well as cause slight deformation of the surface of the bushing 25. This maintains the sunshade lens 21 firmly but resiliently removably positioned in the frame 11.

The sunshade lens 21 is shown in the phantom lines in an intermediate position during insertion into the frame 11. The notch 27 is positioned in engagement with the post and the lens 21 is rotated into wedging engagement with the abutment means 30. Removal is effected by a reverse procedure and may be made somewhat simpler by providing a notch 32 in the margin of the lens to receive the wearer's fingernail and to enhance the ease of removal.

Referring now to FIGS. 5 and 6, a modified form of the invention will be described. A frame 41 is shown in fragmentary elevation in FIG. 5 with a temple attachment means 42 mounting a temple piece 43 shown in cross section. The frame is of conventional design and includes a corrective lens 44 of a modified shape having a cosmetic appearance suitable for females. The sunshade lens 45 is similarly shaped, being slightly larger than the corrective lens 44 in order to completely cover the same as was true in the design shown in FIGS. 1–4. A post means 46 having an enlarged head portion 47 is mounted in the frame 41 in a fashion similar to the post means 22 previously described. The post means 46 is provided with an elastomeric bushing 48 which serves the same function as the bushing 25 on the post means 22.

As best seen in FIG. 5, the sunshade lens 45 is provided with a shoulder or notch 50 which is engaged with the lower portion of the abutment means 51 which may comprise the nose piece of the eyeglasses or the equivalent. A peripheral portion 52 of the sunshade lens 45 above the shoulder or notch 50 engages the nose piece 51 to position the lens 45 with respect to the corrective lens 44. As was the case with the frame 11, the nose piece 51 is angulated towards the post means to assist the enlarged head of the post means in maintaining the sunshade lens from moving in a direction perpendicular to the frame 41.

Installation of the sunshade lens 45 is easily accomplished by positioning the notch or shoulder 50 in engagement with abutment means 51 and rotating the lens as shown in phantom at 45 into position to locate the notch 53 in engagement with the circumference of the elastomeric bushing 48. In this manner, the sunshade lens 45 is wedged on the rearward side of the eyeglasses being firmly held in place in overlying but slightly spaced relation to the corrective lens 44.

The dimensional relation of the sunshade lens to the mounting means is like that described in connection with the embodiment of FIGS. 1–4, that is, the dimension taken from the peripheral portion 52 abutting the abutment means 51 to the inside of the notch 53 is slightly greater than the dimension measured from the circumferential portion of the bushing 48 to the abutment means 51, causing the sunshade lens 45 to be wedged into resiliently held mounting relation with respect to the frame 41.

From the foregoing description it is apparent that the sunshade attachment of the present invention is extremely simple when contrasted to the prior art types having clips, clamps, and other distracting forms of attachment means. In particular, the advantage of having the sunshade lens located behind and within the confines of the associated frame provides a cosmetic appearance like that of prescription-type eyeglasses with tinted lenses. Moreover, the means of attachment for the lens is always present on the associated frame and is located on or very close to the temple mounting means so that it does not cause a distraction to the wearer of the glasses. In fact, because of the continuous presence of the mounting means the wearer becomes accustomed to it in the same fashion as with the temple attachment means.

The sunshade lenses of the present invention are very easily inserted and removed and due to their independence from each other may be much more conveniently carried than prior art types of sunshades. In particular, the lenses being flexible they can withstand a great deal more abusive treatment without fear of destruction or permanent damage than was true with the prior art types having various types of attachment means such as clamps, clips and the like.

The embodiment of FIG. 5 illustrates a form of the invention which is inserted from the top of the frame while the embodiment of FIGS. 1–4 illustrates a sunshade lens which is inserted from the bottom of the frame. Obviously, the peripheral margin of the sunshade lenses can vary to conform to the changes in shape of the associated rim.

Upon a consideration of the foregoing, it will become obvious to those skilled in the art that various modifications may be made without departing from the invention embodied herein. Therefore, only such limitations should be imposed as are indicated by the spirit and scope of the appended claims.

I claim:

1. A sunshade lens attachment for eyeglasses, said eyeglasses including a frame having a pair of lens-receiving rims, each of said rims having temple attachment means located at an outer margin thereof, a lens mounted in each of said rims, a bridge portion joining said rims together to maintain said lenses in spaced relation, post means disposed on each of said rims adjacent each of said temple attachment means, each of said post means projecting outwardly from a rearwardly facing portion of said frame, a pair of flexible sunshade lenses adapted for disposition over each of said lens-receiving rims, each of said sunshade lenses having notch means formed along an outer peripheral portion thereof and engaged with said post means, abutment means on each of said rims adjacent said bridge portion, each of said abutment means comprising a nose piece formed integral with said frame and engaging an inner peripheral margin of each of said sunshade lenses, the dimension of each of said sunshade lenses when taken in a straight line from said notch means to the inner peripheral margin of said sunshade lens engaging said abutment means being slightly greater than the dimension between said post means and said abutment means on the associated rim whereby each of said sunshade lenses is resiliently wedged on said frame in overlying relation to the associated lens.

2. The sunshade lens attachment for eyeglasses of claim 1 wherein said post means includes an enlarged head portion at the outer end thereof and an elastomeric bushing surrounding the post means and extending between said post means and said notch means of said sunshade lens, said elastomeric bushing resiliently urging said sunshade lens towards said abutment means.

3. The sunshade lens attachment of claim 1 wherein said nose piece has a portion thereof angulated towards said post means thereby to prevent withdrawal of said sunshade lens perpendicularly to said frame.

4. The sunshade lens attachment of claim 1 wherein shoulder means is formed on said sunshade lenses, said shoulder means being engaged by said abutment means to maintain said sunshade lens properly positioned during and after installation thereof.

(References on following page)

References Cited

UNITED STATES PATENTS

| | | | |
|---|---|---|---|
| 1,348,713 | 8/1920 | Gitterman | 351—47 |
| 2,482,195 | 9/1949 | Martin | 351—83 X |
| 2,789,462 | 4/1957 | Forgrave | 351—49 |

DAVID SCHONBERG, *Primary Examiner.*

J. W. LEONARD, *Assistant Examiner.*

U.S. Cl. X.R.

2—14; 351—58, 86